March 20, 1962 P. W. COLLYER ET AL 3,025,744
SPECTROMETER
Original Filed Jan. 20, 1960
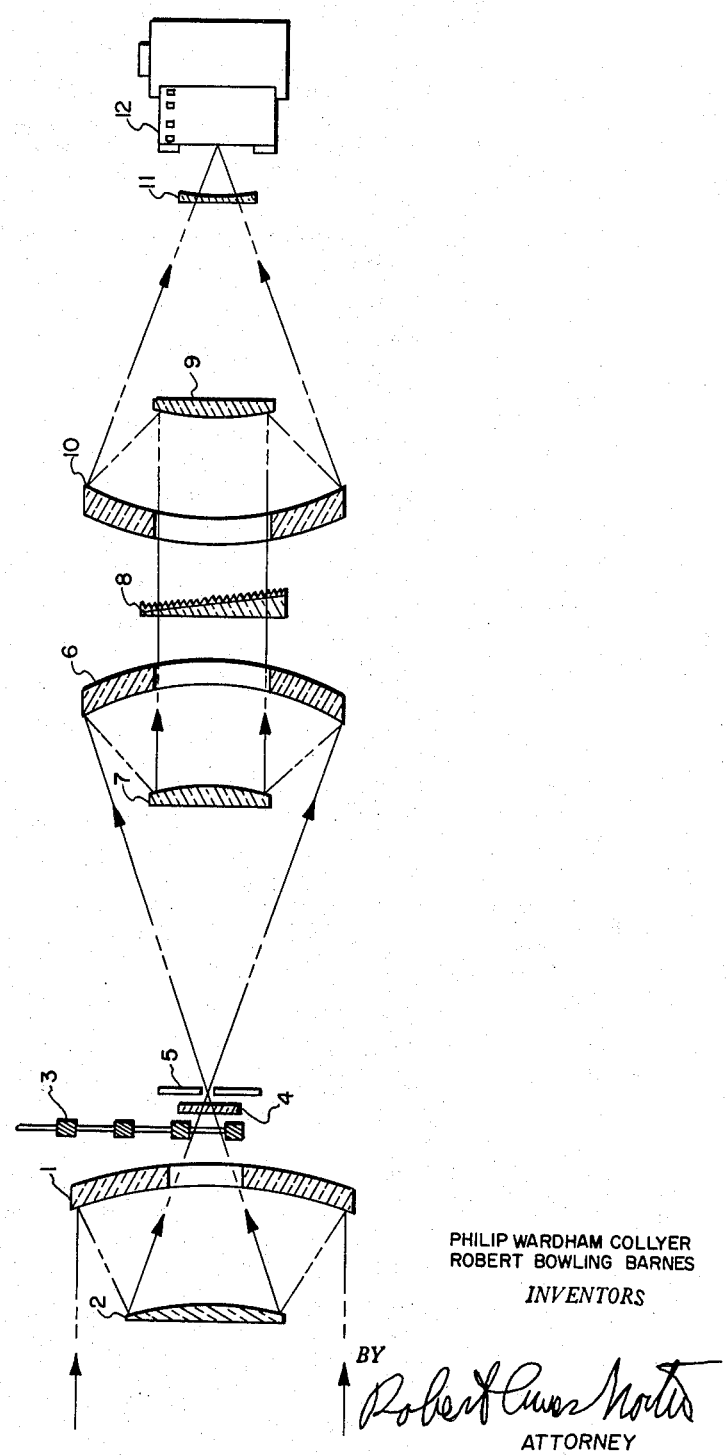
PHILIP WARDHAM COLLYER
ROBERT BOWLING BARNES
*INVENTORS*
BY
ATTORNEY

United States Patent Office 3,025,744
Patented Mar. 20, 1962

3,025,744
SPECTROMETER
Philip Wardham Collyer and Robert Bowling Barnes, Stamford, Conn., assignors to Barnes Engineering Company, Stamford, Conn., a corporation of Delaware
Original application Jan. 20, 1960, Ser. No. 3,568. Divided and this application Jan. 6, 1961, Ser. No. 81,138
4 Claims. (Cl. 88—14)

This invention relates to compact spectrometers of large aperture for the spectral investigation of relatively distant objects.

Spectrometers for laboratory use do not have to be compact and rugged as they normally are more or less permanently located and size and weight is no problem. There are, however, many uses in which the spectrometer should be compact and rugged and especially of a shape such that it can be readily aimed. Many of the portable uses referred to above are of a military nature although the invention is in no sense limited to instruments for military use as there are a number of applications in industry where portability, ruggedness and compactness are of equal importance.

Producing a small rugged spectrometer presents no problem if the aperture is small but then there is a serious loss in sensitivity. As a result in the past spectrometers have been largely compromises. Compact spectrometers for the most part use gratings as dispersing elements.

In our copending application, Serial No. 848,297 filed October 23, 1959, now Patent No. 2,995,973, August 15, 1961, we have described and claimed a type of spectrometer which is compact, rugged and easily aimed. These instruments, however, have been based on an unusual grating use, namely, a grating illuminated by convergent optical radiations. This type of instrument was formerly considered impractical and all of the grating spectrometers used collimated illumination, paying the price of either large and expensive optics or diminished sensitivity. Collimated light grating illumination does present some advantages and it is with this type of instrument that the present invention deals. All of the advantages of collimated light grating illumination are retained and at the same time a compact instrument is produced of high sensitivity which retains a large aperture through the optics without paying the price of excessive size, complexity or lack of ruggedness.

One of the problems in grating spectrometers has also been the grating size itself. Cost of gratings increases enormously beyond a certain small size and when replica gratings are used, which is the economical type, it is difficult to maintain the desired surface in large sizes. Another problem with grating size is in instruments in which the grating has to be rocked at a sufficiently high frequency to produce a modulated beam. This is difficult or impractical with large gratings as the inertia is too high.

The present invention is based on the fact that when objects are spectrally investigated which are relatively sufficiently distant that the resolution of the image of the object in the image plane of the spectrometer is not changed when the object is still further removed in distance. The optics used in the present spectrometer fit this definition.

Essentially in the present invention the receiving optics, whether reflective, as preferred, or refractive, are designed and positioned so that the rays from the distant object which strike the instrument substantially parallel are transformed into a beam which, while still substantially parallel, is of very much smaller cross section than that of the aperture of the instrument, for example, the smaller beam may be as little as one-tenth or less of the instrument aperture. The small beam of parallel rays, i.e., collimated radiation, contains all of the radiant energy striking the instrument except for the small losses in the receiving optics.

The intense concentrated beam containing practically all of the radiant energy then encounters a small grating which does not have to be significantly larger in its dimensions than those of the beam itself. The spectrum then produced is imaged on a detector plane and in the case of the relatively distant objects which are to be spectrally investigated by the instrument sharp spectra are produced with the same total radiant energy even though the grating is far smaller in its dimensions than the entrance aperture of the instrument. The detection of the spectra produced may be effected by more or less standard means, that is to say, the spectra may be periodically moved across a stationary detector or an array of detectors and suitable masking may be used. In the case of optical radiation, for which suitable photographic material is available, the spectrum may be photographed as a whole. It is an advantage of the invention that as far as the detection of the rediations is concerned more or less standard detectors may be employed in their normal manner.

The present invention eliminates the necessity for entrance or exit slits. There is no loss in energy and yet for the particular purposes for which the instruments of the present invention are used the result obtained is as good or from the standpoint of energy utilization actually better than when conventional spectrometric design is used. Putting it another way for the particular purposes of the present instrument as good or better results are obtained in spite of the elimination of parts which were formerly needed. This elimination of parts is of great practical value in field instruments, such as instruments for use by the military, where weight is a serious drawback and where the elimination to the maximum possible degree of delicately moving parts is an important desideratum in order to produce a light, compact instrument of maximum ruggedness.

The invention will be described in greater detail and its operation and advantages brought out in connection with the drawings which show, in diagrammatic section, a completely in line instrument using a transmission grating.

The optical collecting means shown in the drawing are a Cassegrain system with mirrors 1 and 2. After passing through the central aperture of the first Cassegrain mirror the beam passes through a filter slide 3 so that different narrow bands of radiation can be selected if desired. There is also present a neutral wedge 4 for varying the intensity of the radiation.

The beam after passing through the slot 5 encounters a second catoptric system composed of elements 6 and 7. However, the resulting collimated beam instead of striking a reflecting grating passes through a wedge transmission grating 8 which keeps the diffracted beam comprised of a particular wavelength parallel to the optic axis. The collimated beam, dispersed in the form of a spectrum, strikes a third mirror combination 9 and 10 and the spectrum is imaged on a detector which in this figure is shown as a film strip. The conventional field lens 11 is also included. The spectrum is reproduced on the film in the form of a band and will show the usual characteristics of a photographed spectrum. Successive exposures may be taken on the film which is, of course, enclosed in a conventional camera housing which, however, is not shown as it forms no part of the invention and would interfere with the clarity of the illustration of the optical paths of the device.

The instrument is not limited to the use of a film strip as a detector and any other detector of a suitable design may be used.

The in line construction of the instrument presents advantages and at the same time all of the energy of the full aperture of the optical collecting system is utilized. The whole instrument may be mounted in a tube no larger in cross section than that of the first Cassegrain mirror. The tube is rugged and can be mounted for any aiming purpose desired. At the same time the tubular construction possesses the advantages that it may be made in sections which fit together and can be replaced by only semiskilled personnel in the field without laboratory facilities. For military purposes this is an enormous advantage because damaged sections can be replaced whole in a very short time.

This application is a division of our copending application Serial No. 3,568, filed January 20, 1960.

We claim:

1. An in line, compact, high resolution spectrometer comprising in optical alignment, (a) optical collecting means for collecting radiation from distant radiation sources and transforming substantially parallel radiation therefrom into a collimated beam of much smaller cross-section than the entrance aperture of the optical collecting means, (b) a transmission grating in said collimated beam, (c) a detector for optical radiations of wavelengths for which the transmission grating is transparent, (d) and means for imaging at least one wavelength in the diffracted beam from the grating onto the detector.

2. A device according to claim 1 in which the optical system is catoptric.

3. A device according to claim 2 in which the catoptric optical means comprises a pair of Cassegrain mirrors.

4. A device according to claim 2 in which the means for imaging the diffracted beam onto the detector comprises catoptric means.

References Cited in the file of this patent

UNITED STATES PATENTS

| | | |
|---|---|---|
| 2,444,560 | Feldt et al. | July 6, 1948 |
| 2,741,691 | Lee | Apr. 10, 1956 |

OTHER REFERENCES

"Reflection Image Reducer," Greenler, Journal of the Optical Society of America, vol. 6, No. 6, June 1956, pages 433–434.